United States Patent [19]

Gage et al.

[11] Patent Number: 5,586,101
[45] Date of Patent: Dec. 17, 1996

[54] MAGNETO-OPTIC DATA STORAGE SYSTEM WITH DIFFERENTIAL DETECTION CHANNELS HAVING SEPARATE GAIN CONTROL CIRCUIT

[75] Inventors: Edward C. Gage, Fairport; Steven C. Dohmeier, Rochester, both of N.Y.

[73] Assignee: Eastman Kodak Company, Rochester, N.Y.

[21] Appl. No.: 397,293

[22] Filed: Mar. 1, 1995

[51] Int. Cl.$^6$ .................................................. G11B 7/00
[52] U.S. Cl. .............................. 369/124; 369/13; 369/110
[58] Field of Search ................................... 369/44.41, 13, 369/107, 120, 124, 54, 100, 44.25, 44.35, 110

[56] References Cited

U.S. PATENT DOCUMENTS

| | | |
|---|---|---|
| 4,449,139 | 5/1984 | Geyer et al. . |
| 4,462,036 | 7/1984 | Leonard et al. . |
| 4,519,061 | 5/1985 | Dahneke et al. . |
| 4,539,573 | 9/1985 | Marchant et al. . |
| 4,617,654 | 10/1986 | Gross et al. . |
| 4,691,308 | 9/1987 | Takagi et al. . |
| 4,718,121 | 1/1988 | Epworth . |
| 4,730,294 | 3/1988 | Funada . |
| 4,774,615 | 9/1988 | Revelli et al. . |
| 4,801,798 | 1/1989 | Lange . |
| 4,833,662 | 5/1989 | Yoda . |
| 4,841,510 | 6/1989 | Yoshizawa . |
| 4,964,110 | 10/1990 | Horimai et al. . |
| 4,992,754 | 1/1991 | Blauvelt et al. . |
| 5,084,850 | 1/1992 | Yanagawa et al. . |
| 5,113,386 | 5/1992 | Whitehead et al. . |
| 5,132,639 | 7/1992 | Blauvelt et al. . |
| 5,132,953 | 7/1992 | Matsubayashi . |
| 5,166,509 | 11/1992 | Curran . |
| 5,166,989 | 11/1992 | Kurdi et al. . |
| 5,189,650 | 2/1993 | Watanabe et al. . |
| 5,200,942 | 4/1993 | Hosobata et al. . |
| 5,247,501 | 9/1993 | Hashimoto et al. . |
| 5,265,085 | 11/1993 | Jaquette et al. . |
| 5,282,188 | 1/1994 | Gage . |
| 5,287,340 | 2/1994 | Chapman et al. . |
| 5,295,129 | 3/1994 | Lee . |
| 5,339,302 | 8/1994 | Takahashi et al. . |
| 5,442,618 | 8/1995 | Dewey et al. .......................... 369/124 |

FOREIGN PATENT DOCUMENTS

| | | |
|---|---|---|
| 225564 | 6/1987 | European Pat. Off. . |
| 310795 | 8/1988 | European Pat. Off. . |
| 60-93649 | 5/1985 | Japan . |
| 60-223041 | 11/1985 | Japan . |
| 60-223044 | 11/1985 | Japan . |
| 63-18551 | 1/1988 | Japan . |
| 63-18549 | 1/1988 | Japan . |
| 63-298735 | 12/1988 | Japan . |
| 63-300448 | 12/1988 | Japan . |
| 1-59656 | 3/1989 | Japan . |
| 1-296440 | 11/1989 | Japan . |
| 1-315039 | 12/1989 | Japan . |
| 2-105357 | 4/1990 | Japan . |
| 2-152022 | 6/1990 | Japan . |
| 2-193347 | 7/1990 | Japan . |
| 2-287937 | 11/1990 | Japan . |
| 3-104041 | 5/1991 | Japan . |
| 3-142716 | 6/1991 | Japan . |
| 3-160645 | 7/1991 | Japan . |
| 3-292651 | 12/1991 | Japan . |
| 4-132031 | 5/1992 | Japan . |
| 4-298836 | 10/1992 | Japan . |
| 5-159404 | 6/1993 | Japan . |

Primary Examiner—David C. Nelms
Assistant Examiner—Son Mai
Attorney, Agent, or Firm—Raymond L. Owens

[57] ABSTRACT

An apparatus and method for detecting a data signal read from a magneto-optic (MO) storage medium. First and second detected signals are generated from first and second portions, respectively, of a radiation beam reflected from the medium. First and second gain control circuits are coupled to the first and second detectors, respectively. Each of the gain control circuits is operative to alter the gain of a signal path of the corresponding detected signal in response to a control signal which varies in accordance with a difference between the corresponding detected signal and a reference signal. The reference signals in each gain control circuit may be a common reference voltage level. A signal difference circuit produces a data signal corresponding to the difference between the detected signals.

20 Claims, 3 Drawing Sheets

MAGNETO-OPTIC DATA STORAGE SYSTEM WITH DIFFERENTIAL DETECTION CHANNELS HAVING SEPARATE GAIN CONTROL CIRCUIT

CROSS-REFERENCE TO RELATED APPLICATION

Reference is made to commonly-assigned U.S. patent application Ser. No. 08/397,701 filed Mar. 1, 1995 concurrently herewith, by Gage et al entitled "OPTICAL DATA STORAGE SYSTEM WITH DIFFERENTIAL DATA DETECTION AND SOURCE NOISE SUBTRACTION FOR USE WITH MAGNETO-OPTIC, WRITE-ONCE AND OTHER OPTICAL MEDIA", the disclosure of which is incorporated herein by reference.

FIELD OF THE INVENTION

The present invention relates generally to optical data storage systems. More particularly, the present invention relates to an improved optical system which utilizes separate automatic gain control (AGC) circuits in two differential detection channels to improve detected signal quality.

BACKGROUND OF THE INVENTION

Optical storage systems typically use a radiation beam generated and processed in an optical head to record data on and/or retrieve data from an optical storage medium. Many of these systems utilize differential detection in order to detect small signal fluctuations in the presence of various types of system noise. An example is a conventional magneto-optic (MO) system, in which data is stored on an MO medium in the form of marks having a distinct magnetic orientation. MO systems generally utilize Kerr rotation of a return beam reflected from the MO medium to distinguish marked and unmarked areas. The Kerr rotation produces relatively small variations in the return beam and is therefore difficult to detect without differential detection. Differential detection channels are provided in the MO system by separating the return beam into two orthogonal polarization components using a polarization beam splitter. The components are applied to separate detectors, and the resulting detected signals are applied to inputs of a differential amplifier which generates a differential MO data signal representative of the stored data.

In differential detection channels, it is usually important to maximize the common-mode noise rejection in order to ensure optimal system performance. Significant degradations in output data signal carrier-to-noise ratio (CNR) may result if, for example, one or more of the elements in the differential channels do not provide substantially equivalent gain and/or phase variations. One available technique for avoiding such degradations involves imposing strict tolerances on the alignment and/or performance of various system elements including polarization beam splitters, waveplates, detectors and amplifiers. However, such strict tolerances can significantly increase optical head design and manufacturing costs, and may result in a head which is unduly susceptible to, for example, variations in media parameters. Furthermore, it is generally difficult to maintain such tolerances over a broad range of operating frequencies and/or temperatures.

Another possible approach involves utilizing variable gain components in one or more of the differential detection channels to reduce amplitude differences between the detected signals at the differential amplifier input. U.S. Pat. No. 4,691,308 discloses an MO system with differential detection channels and a variable gain amplifier in one of the channels. The variable gain in one channel is adjusted in response to an error signal corresponding to amplitude differences between the detected signals. The variable gain adjustment attempts to reduce the amplitude difference between the detected signals such that common-mode rejection in the differential amplifier is improved. However, this one-channel variable gain system is susceptible to a number of problems, including long-term drift in signal levels, variable phase shifts as a function of signal level, and poor recovery from non-ideal conditions such as out-of-focus or media defects. Other problems with one-channel variable gain systems include the inability to adequately compensate for undesirable output signal modulation resulting from, for example, media birefringence.

Japanese Patent Publication No. 4-298836 entitled "Magneto-optical Recording and Reproducing Device" appears to disclose an MO detection system which uses a pair of level control circuits controlled in accordance with "double refractivity information." However, this system does not appear to improve common-mode rejection in differential detection. Furthermore, it apparently utilizes a common control signal for both level control circuits and thus fails to solve the long-term drift, output signal modulation and other problems inherent in the one-channel variable gain system of U.S. Pat. No. 4,691,308.

As is apparent from the above, a need exists for a magneto-optic system with differential detection which provides improved common-mode rejection and output MO data signal CNR without the strict tolerances, long-term drift and other problems of the prior art.

SUMMARY OF THE INVENTION

The present invention provides an apparatus and method for providing differential detection in a magneto-optic (MO) system using separately-controlled variable gain circuits in each differential detection channel. An exemplary apparatus in accordance with one aspect of the present invention may include first and second gain control circuits coupled to first and second detectors, respectively, and receiving first and second detected signals therefrom, respectively. Each of the gain control circuits is operative to alter the gain of a signal path of the corresponding detected signal in response to a control signal which varies in accordance with a difference between the corresponding detected signal and a corresponding reference signal. The reference signal in both gain control circuits may be a common reference voltage level. A signal difference circuit coupled to the first and second gain control circuits generates a data signal by taking the difference between the detected signals. One or more delay lines may also be included to provide phase matching of the first and second detected signals at an input of the signal difference circuit.

In accordance with another aspect of the present invention, a method is provided which may include the steps of controlling the gain of a signal path of the first detected signal in response to a first control signal which varies in accordance with a difference between the first detected signal and a first reference signal; controlling the gain of a signal path of the second detected signal in response to a second control signal which varies in accordance with a difference between the second detected signal and a second reference signal; and generating a data signal as a difference between the detected signals. The first and second reference signals may be, for example, a common set point voltage level.

The present invention provides a number of advantages including increased common-mode rejection and output CNR as well as an improved response to non-ideal conditions. Undesirable output signal modulation and long-term signal level drift is significantly reduced relative to that of prior art variable gain systems. In addition, the reference signals and/or control signals used in each gain control circuit can be varied digitally to change the detected signal levels during recording, optical disk drive start-up or other phases of operation.

Further features of the invention, its nature and various advantages will become more apparent from the accompanying drawings and following detailed description of the invention.

DETAILED DESCRIPTION OF THE INVENTION

Figure 1:
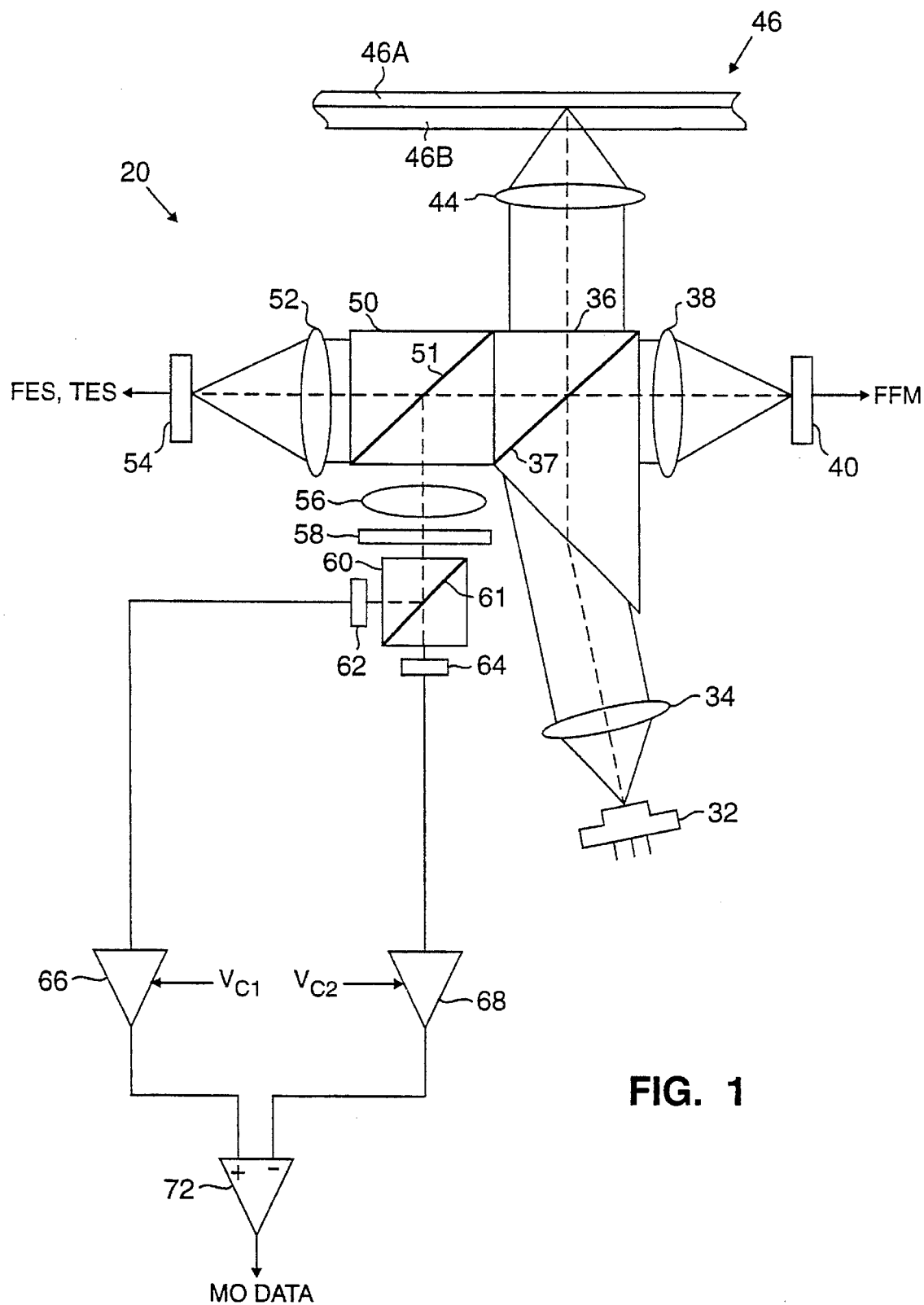
FIG. 1 is an exemplary optical data storage system with separately-controlled variable gain differential detection channels in accordance with the present invention.

FIG. 1 shows an exemplary optical recording system 20 which utilizes differential detection to generate a magneto-optic (MO) data signal. An incident radiation beam is generated by an optical source 32, which may be, for example, a laser diode, a laser or an LED. The source produces an incident radiation beam at a given wavelength, which will generally vary depending upon the application. An exemplary wavelength suitable for use in the system 20 is about 780 nanometers. The radiation beam from optical source 32 is collimated by a collimating lens 34, which in this embodiment may have a focal length on the order of 8 mm. The collimated radiation beam is transmitted through a polarization beam expander/splitter 36. Alternative beam expansion techniques could be used, such as including a circularizing lens (not shown) in the path of the incident beam, and would generally alter the desired focal length of lens 34. A suitable circularizing lens is the model VPS700 lens available from Blue Sky Research of San Jose, Cali.

The beam expander/splitter 36 may have an s-polarization reflectivity of about 100% and a p-polarization reflectivity of about 20%, indicating that 100% and 20% of the intensity of the s-polarized beam components and p-polarized beam components, respectively, are reflected by an internal surface 37, and any remaining portions are transmitted through the surface 37. A portion of the incident radiation beam is thus reflected by surface 37 toward a detector focusing lens 38 and thereby focused onto a front facet detector 40. The reflected portion of the linearly-polarized radiation beam thus includes both s-polarized and p-polarized components, which are detected in detector 40 to provide an indication of the intensity level of the incident radiation beam. The front facet detector 40 is also referred to as a front facet monitor (FFM) or, more generally, an optical source monitor. An FFM signal from detector 40 may be used, for example, to normalize a tracking or MO data signal, or in a source power servo loop (not shown) to maintain the output power level of source 32 at a desired value. The FFM signal could also be used in a front facet subtraction technique to reduce source noise in a write-once (WO) data signal. See, for example, U.S. Pat. No. 5,363,363 entitled "Apparatus and Method for Laser Noise Cancellation in an Optical Storage System Using a Front Facet Monitor Signal," which is assigned to the assignee of the present invention and incorporated by reference herein. Although in systems utilizing a laser diode optical source the detector 40 generally monitors radiation from a front facet of the laser diode, the detector 40 could also be used to monitor radiation from a rear facet of the laser diode.

The portion of the incident radiation beam which is not reflected by surface 37 to front facet detector 40 passes through surface 37 and is incident on an objective lens 44. The surface 37 of polarization beam splitter/expander 36 transmits a linear p-polarization of the radiation beam, which is perpendicular to the s-polarized portion of the radiation beam reflected by surface 37. The direction of the incident beam may be altered by including additional optical elements (not shown), such as a turning prism or fully-reflecting mirror, between the beam splitter 36 and the objective lens 44. For example, a turning prism or reflecting mirror could be arranged to reflect the beams by 90° to facilitate placement of the components of system 20 relative to the storage medium in a reduced-height optical disk drive.

Objective lens 44 focuses the incident beam onto an optical storage medium 46. Optical components 34, 36 and 44 represent only an exemplary means of applying an incident radiation beam to the medium, and any of a number of other arrangements of components could be used as an application means herein. The storage medium 46 typically includes data tracks (not shown) arranged in a spiral or concentric circles on a data storage surface 46A. A portion of the medium 46 is shown in a side-sectional view in FIG. 1. The storage medium may include a transparent substrate 46B which serves as a protective layer over the data storage surface 46A. The exemplary medium 46 may also include a pregroove or similar light-diffracting structure suitable for generating a tracking signal using known techniques. The incident radiation beam reads data previously recorded in the form of marks on storage medium 46 by detecting variations in a return beam reflected from the medium. The system 20 may also be used to record data on the medium 46 by modifying the power level of the incident beam or by providing additional recording system elements, the placement and operation of which are generally well-known in the art.

It will now be assumed that the medium 46 is an MO medium, although the present invention is suitable for use with a number of different optical media types, including WO media. The incident beam applied to the MO medium has a substantially linear polarization. Interaction with the data storage surface 46A causes the incident radiation beam to be reflected and diffracted therefrom. The resulting radiation beam, referred to herein as a return beam, generally has an elliptical polarization due to Kerr effect variations produced at the MO medium surface. The return beam is collimated by objective lens 44, substantially reflected by surface 37, and then applied to a polarization beam splitter 50 which may have an s-polarization reflectivity of about 100% and a p-polarization reflectivity of about 75%. As a result, surface 51 transmits about 25% of the p-polarized portion of the beam incident thereon to a detector focusing lens 52. The lens 52 focuses the transmitted portion of the beam onto a detector 54, which may include multiple detector elements. The detector 54 may be used to generate focus and tracking error signals using well-known techniques.

The portion of the return beam which is not transmitted through surface 51 is reflected by surface 51 toward a lens 56 and through a general wave plate 58. The general wave plate 58 modifies the polarization of the portion of the return beam passing through it by a given retardance value between about 90° and 180°. The actual retardance value selected may vary with the application. Factors which should be taken into account in selecting a suitable retardance value include optical head properties, such as phase shifts introduced by beam splitters, and media properties such as media birefringence. Details regarding selection of a suitable retardance value for wave plate 58 to optimize the read-out data signal-to-noise ratio in a given embodiment may be found in U.S. Pat. No. 5,282,188, which is assigned to the assignee of the present invention and incorporated by reference herein. Those skilled in the art will recognize that wave plate 58 may be used with any of a number of alternative retardance values and/or plate rotations.

The portion of the return beam transmitted through wave plate 58 is then applied to another polarization beam splitter 60. A surface 61 reflects an s-polarized component of the return beam to a first detector 62 and transmits a p-polarized component to a second detector 64. The polarization beam splitter surfaces 37, 51 and 61 may be, for example, multilayer coatings which reflect and/or transmit desired amounts of s-polarized and p-polarized light. It should be noted that any of a number of alternative differential detection arrangements could be used in system 20. For example, the beam splitter 60 could be replaced with a Wollaston beam splitter and the position of detectors 62, 64 could be adjusted such that one detector receives components of the return beam having a p-polarization while the other receives components having an s-polarization. As another alternative, the general wave plate 58 could be replaced with a phase plate selected to remove phase ellipticity in the return beam, and beam splitter 60 could be a rotatable Wollaston beam splitter rotated to a fixed angle of about 45° The beam splitter 60 could also be replaced with a larger beam splitter, such as beam splitter 50. In general, the beam splitter 60 separates the portion of the return beam incident thereon into first and second polarization components which are supplied to detectors 62, 64, respectively. The detectors 62, 64 generate first and second detected electrical signals from the polarization components. Detectors 62, 64 may be, for example, positive-intrinsic-negative (PIN) or avalanche photodiodes, or any other device capable of detecting incident optical radiation. Suitable photodiodes for detectors 42, 46 include part Nos. FFD100 and FFD200, from EG&G Optoelectronics of Quebec, Canada.

The first and second detected signals from detectors 62, 64, respectively, may be used to provide a differential MO data signal which is indicative of data recorded on MO medium 46. One differential detection channel in system 20 includes detector 62 and a first variable gain amplifier 66, while the other differential channel includes detector 64 and a second variable gain amplifier 68. The gains of amplifiers 66, 68 are varied in accordance with control signals $V_{C1}$ and $V_{C2}$, respectively, as will be described below in conjunction with FIG. 2. The outputs of the variable gain amplifiers 66, 68 are applied to inputs of a differential amplifier 72 which generates an MO data signal as the difference between the first and second detected signals. Other signal difference circuits suitable for generating an MO data signal from the first and second detected signals could be used in place of differential amplifier 72. Although not shown in FIG. 1, system 30 may include additional elements suitable for processing the detected signals. For example, an analog-to-digital converter, microprocessor, memory, and digital-to-analog converter may be included to obtain and process samples of the data signals. In addition, the control signals for variable gain amplifiers 66, 68 could be supplied by the microprocessor.

The system 20 of FIG. 1 can also be used to generate a WO data signal from, for example, a phase change WO medium or an ablative WO medium by summing the detected signals from detectors 62, 64. Data signals may thus be generated for both MO media and WO media in system 20 by appropriate processing of the detected signals from detectors 62, 64. Additional signal combining electronics, of a type generally well-known in the art, may be included in system 20 to provide the WO data signal.

Figure 2:
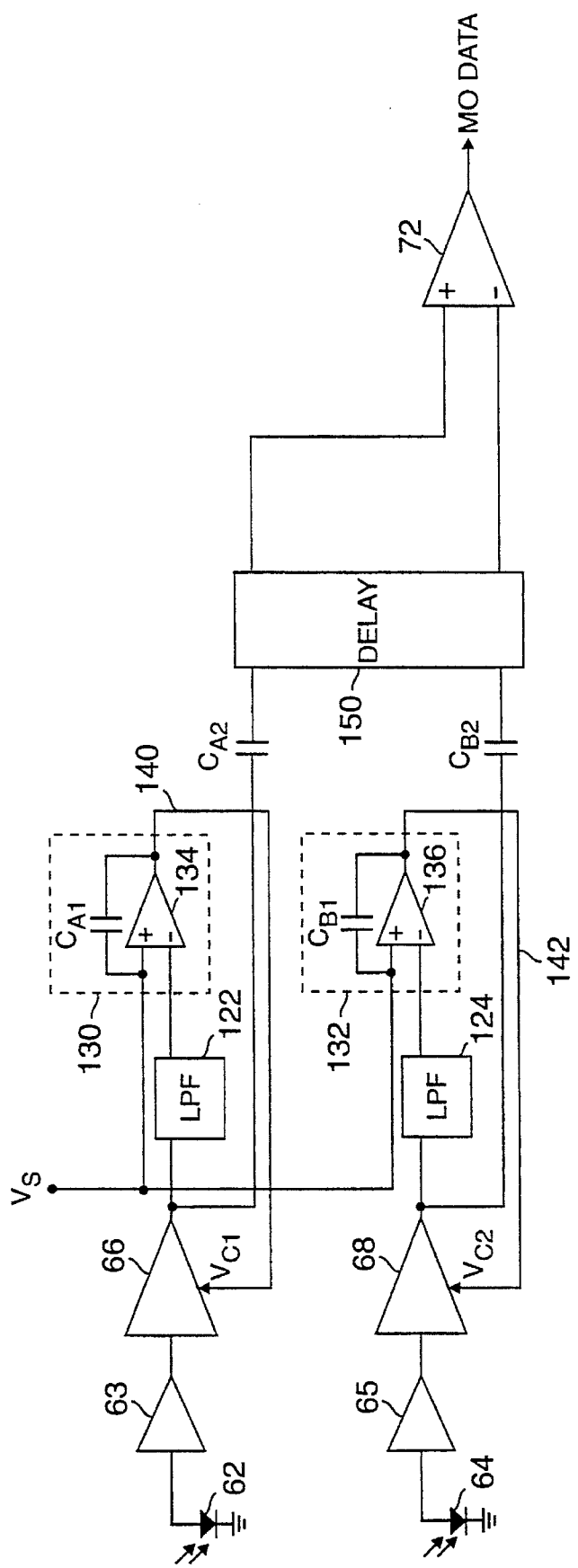
FIG. 2 is a schematic diagram illustrating the separately-controlled variable gain differential detection channels.

FIG. 2 is a schematic diagram showing the differential detection channels of system 20 in greater detail. The detection channels each include a separate automatic gain control (AGC) servo loop to generate the control signal $V_{C1}$ or $V_{C2}$ which is used to adjust the gain of amplifier 66 or 68, respectively. The variable gains are adjusted such that detected signal high-frequency (HF) components provided to the differential amplifier 72 are amplitude matched. The gain adjustments are made by comparing direct-current (DC) and other low-frequency (LF) components in the detected signals to a reference signal which in this embodiment is a predetermined set point voltage $V_S$. Other reference signals, including DC and time-varying voltage or current signals, may also be used. The AGC servo loops match detected signal amplitudes at the input of differential amplifier 72 and thereby maximize common-mode rejection and the output SNR of the MO data signal. The two AGC servo loops include variable gain amplifiers 66, 68, low pass filters 122, 124, error detector/integrators 130, 132 and feedback control signal lines 140, 142. In this embodiment, the variable gain amplifiers 66, 68 are connected to the detectors 62, 64, respectively, through preamplifiers 63, 65, respectively. Preamplifiers 63, 65 may be OPA620 amplifiers from Burr-Brown, Inc. of Tucson, Ariz. In other embodiments, preamplifiers 63, 65 could be eliminated and variable gain amplifiers 66, 68 could serve as preamplifiers.

The detected signals from amplifiers 66, 68 are passed through the low-pass filters 122, 124 and supplied to the error detector/integrators 130, 132, respectively. The error detector/integrators compare the filtered signals with the predetermined set point voltage $V_S$ in amplifiers 134, 136, respectively to generate error signals. The amplifiers 134, 136 are configured to integrate the detected error signals over time using capacitors $C_{A1}$, $C_{B1}$, respectively. The integrated error signal outputs of amplifiers 134, 136 are fed back via lines 140, 142 as control signal inputs $V_{C1}$, $V_{C2}$ to amplifiers 66, 68, respectively. Each AGC servo loop maintains an error signal of zero volts within the bandwidth of the loop. The detected signals from amplifiers 66, 68 are also supplied via capacitors $C_{A2}$ and $C_{B2}$ to differential amplifier 72. Capacitors $C_{A2}$ and $C_{B2}$ serve to block the DC components of the detected signals from reaching amplifier 72. The capacitors $C_{A2}$ and $C_{B2}$ thus pass only alternating-current (AC) components of the detected signals to differential amplifier 72. Although those skilled in the art will recognize that capacitors $C_{A2}$ and $C_{B2}$ do not provide a sharp cut-off at a particular frequency, in this embodiment AC components are generally considered to be components other than DC. In alternative embodiments, the capacitors $C_{A2}$ and $C_{B2}$ may be replaced with more complex signal filters to provide any desired frequency response in the channel, or may be eliminated such that the differential amplifier 72 receives all signal components including DC components.

A delay element 150 is used to adjust the detected signal phase in at least one of the detected signal channels such that the detected signals are in-phase at the input of amplifier 72. In general, the amplifiers used in the circuitry of FIG. 2 exhibit relatively linear group delay responses. A constant group delay can generally be considered as a fixed signal propagation time independent of frequency. Thus, the detection channels may be phase equalized using a passive analog delay line providing a fixed amount of delay. The delay element 150 may therefore be, for example, a manually or electronically controlled programmable delay line providing a selectable amount of delay in discrete increments, or multiple delay lines providing a desired total amount of delay. One suitable device is the ten nanosecond, ten tap variable delay line part No. 60Z14A010H from Sprague Electric Co. of Stamford, Conn. Alternatively, the delay element 150 may be a single fixed amount of delay calculated to provide the desired phase matching at the input of amplifier 72. The term "delay line" as used herein refers to devices providing either fixed or adjustable amounts of delay using physical lengths of transmission line or any other suitable delay mechanism. The amount of delay provided by delay element 150 will generally vary depending upon the relative length of the detected signal paths. It is preferred that the phase difference between the two detected signals at the input of differential amplifier 72 is reduced to a value less than about five degrees at the highest data channel frequency of interest, although larger phase differences may be acceptable in a given application. Of course, reducing the phase difference to zero will produce maximum common-mode noise rejection in amplifier 72. Although the delay element 150 is shown in both detected signal channels in FIG. 2, it should be understood that delay may be introduced in only one of the channels.

The variable gain amplifiers 66, 68 are preferably matched amplifiers in a device such as the part No. AD602 available from Analog Devices of Norwood, Mass. The AD602 package includes two matched, low noise, voltage-controlled amplifiers with relatively stable group delay, a maximum control bandwidth of about 1 MHz, an amplification bandwidth of about 35 MHz independent of gain setting, a gain scaling of about 32 dB/volt and a gain range of about −10 dB to +30 dB. Of course, amplifiers with other bandwidth and gain parameters could also be used. Alternative variable gain amplifiers include the part Nos. CLC 520 or CLC 522 from Comlinear Inc., of Fort Collins, Colo. and the part No. VCA-610 from Burr-Brown, Inc. of Tucson, Ariz. It should be emphasized that these amplifiers are exemplary only, and numerous other alternatives will be apparent to those skilled in the art.

The low pass filters 122, 124 limit the bandwidth of the portion of the detected signal that is fed back to control the gain of the variable gain amplifiers 66, 68, respectively. This bandwidth limiting reduces potential oscillations and modulation noise in the loops before the error detector/integrators 130, 132. Modulation noise can result when HF components of the first and second detected signals have different amplitudes or a duty cycle other than fifty percent. A mismatch in detected signal amplitudes at the input of differential amplifier 72 can then arise even though the DC and/or LF components of the detected signals have been equalized by the servo loops. The magnitude of the channel gain error from modulation noise is generally dependent on the cross-channel amplitude mismatch, the degree to which the duty cycle deviates from fifty percent, and the amplitude of the DC signal components.

The low pass filters 122, 124 may be implemented as, for example, single-pole resistor-capacitor (RC) networks. Higher order filters could also be used, depending on the amount of filtering required in a given application. A single-pole filter suitable for use in a system in which the data signal HF components range from about 2.5 to 5 MHz has a 3 dB passband of about 50 kHz and reduces modulation noise by approximately 35 dBo The cut-off frequency of filters 122, 124 is limited on the high end by the system data rate and on the low end by the highest frequency of the system perturbations that the servo is required to eliminate. For example, in certain applications it may be desirable for the servos to track media birefringence-induced distortions at frequencies of up to 5 kHz or more. A suitable cut-off frequency for use in many optical storage applications is about 100 kHz. This cut-off frequency refers to a frequency above which signal components are attenuated by about 10 dB or more.

Integrator amplifiers 134, 136 are preferably low offset, low bandwidth devices such as the OP400 amplifiers from Analog Devices of Norwood, Mass. A low offset can limit channel gain error, and a low bandwidth can provide further filtering of modulation noise. In a preferred embodiment, the bandwidth of amplifiers 134, 136 is about six to ten times the cut-off frequency of low pass filters 122, 124. This value maintains the low pass filter passband as the dominant passband control of the system.

Figure 3:
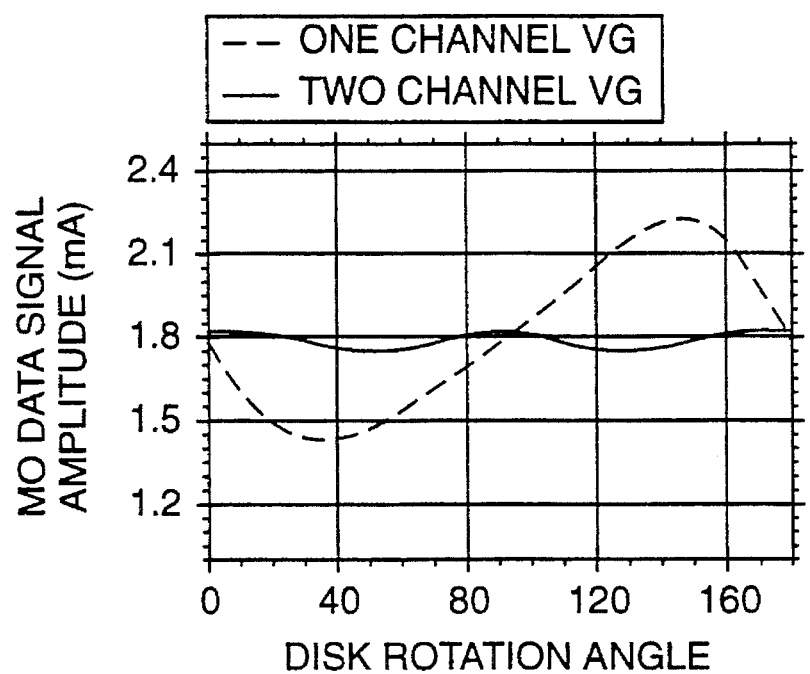
FIG. 3 compares system performance for two-channel variable gain in accordance with the present invention with a prior art one-channel variable gain approach, as a function of optical disk rotation angle.

FIG. 3 illustrates the performance of system 20 with the two-channel variable gain of FIG. 2 relative to that of a prior art one-channel variable gain system such as that described in the above-cited U.S. Pat. No. 4,691,308. The performance is illustrated in terms of the signal distortion arising from media birefringence as a function of media rotation angle. The medium is assumed in this example to be an MO disk including an active layer of terbium-iron-cobalt (TeFeCo) with an overlying protective substrate, or coversheet, of polycarbonate. The coversheet is about 80 to 90 microns thick, and is assumed to have a birefringence of 20 nm at an incident radiation beam wavelength of about 780 nm, a reflectivity of 20%, a Kerr rotation of about 0.83°, and an ellipticity of 0.34°. The coversheet was also assumed to exhibit rectangular coordinate variations in effective birefringence as a function of MO disk rotation angle, as is evident form the plots of FIGS. 3 and 4. Additional detail regarding coversheeted media suitable for use with the present invention may be found in, for example, U.S. Pat. Nos. 4,449,139, 4,462,036, 4,519,061, 4,539,573 and 4,801,798, which are assigned to the present assignee and incorporated by reference herein.

The performance of this exemplary coversheeted MO medium was analyzed for both one-channel variable gain and two-channel variable gain using a model based on the notation described in R. C. Jones, "A New Calculus for the Treatment of Optical Systems," J. Opt. Soc. Am., Vol. 31, p. 488, 1941, which is incorporated by reference herein. In this model, the optical head was assumed to provide a phase correction of about −22°. Additional details regarding a suitable analysis model will be apparent to those skilled in the art and will therefore not be further described herein.

The coversheet birefringence is generally not uniform over the disk surface. As noted above, the present example assumes rectangular coordinate variations in birefringence. The amount of birefringence-induced distortion in the detected signal will therefore vary as a function of disk rotation angle as the disk moves relative to the incident beam in the optical head. It should be noted that presently-available MO media typically do not include a coversheet of this type due to the inability of prior art detection systems to adequately compensate for the birefringence-induced distortion in the output MO data signal.

The variation in output MO data signal amplitude is shown in FIG. 3 as a function of disk rotation angle for the exemplary coversheeted MO medium described above. The dashed curve illustrates the output signal modulation in the above-described one-channel variable gain system resulting from the coversheet birefringence. It is clear that the servo in the one-channel variable gain system fails to adequately compensate for the birefringence-induced distortion. The solid curve indicates the improvement obtained using the two-channel variable gain circuitry of FIG. 2. The two separate AGC servo loops closely track and compensate the media birefringence as the disk rotates, producing an output MO data signal with substantially reduced distortion. In this example, the one-channel variable gain system provides an output signal modulation of about 22%, while the two-channel technique reduces output signal modulation to about 2%.

Figure 4:
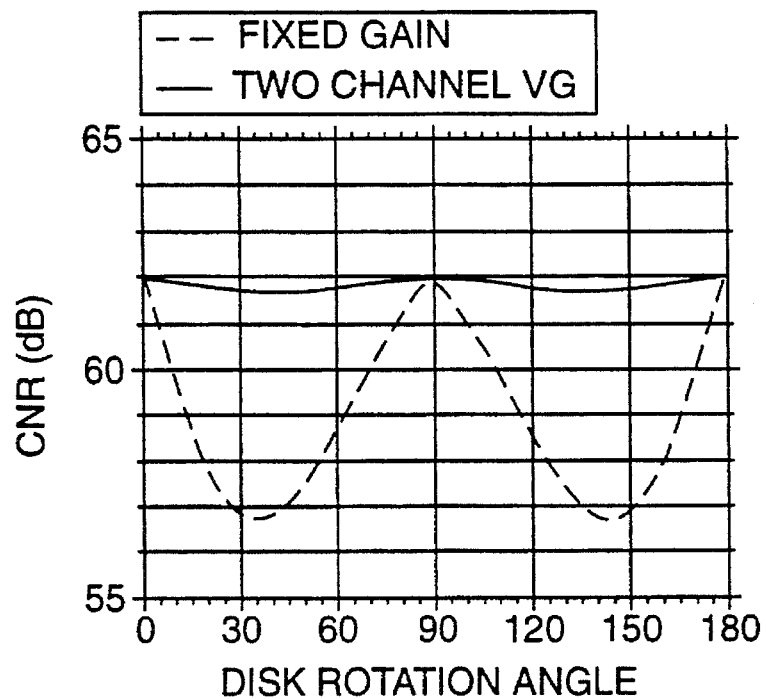
FIG. 4 compares system performance for two-channel variable gain in accordance with the present invention with a prior art fixed channel gain approach, as a function of optical disk rotation angle.

FIG. 4 compares output signal carrier-to-noise ratio (CNR) in the two-channel variable gain system of the present invention with that of a prior art system having fixed gain in both detection channels. The medium is again assumed to be the exemplary coversheeted MO medium described above. The performance of the fixed gain system is shown by the dashed curve, and exhibits significant variations in CNR as a function of disk rotation angle. The two-channel variable gain circuitry of the present invention produces an improved CNR relative to that provided in the fixed gain system, as illustrated by the solid curve. It should be noted that a one-channel variable gain technique in accordance with the prior art will produce CNR variations similar to those shown by the solid curve of FIG. 4, but will also exhibit degradations resulting from the additional output signal modulation as shown in FIG. 3. It should be noted that the two-channel variable gain of the present invention provides a number of other advantages, including improved tolerance to system variations such as, for example, component misalignment, detector mismatch, preamplifier mismatch, and wavelength fluctuations in the optical source.

The embodiments of the present invention described above utilized variable gain amplifiers 66, 68 to adjust channel gain. Other embodiments could use other variable gain circuits which provide a variable amount of gain in response to an input control signal. For purposes of the present invention, a variable attenuator providing a variable amount of signal attenuation in response to a control input is considered a type of variable gain circuit. For example, the Analog Devices AD602 amplifier noted above is also capable of providing a variable amount of signal attenuation.

In alternative embodiments, each of the variable gain circuits could use a different set point voltage or reference signal, rather than the single common set point voltage $V_S$ shown in FIG. 2. The actual reference signal used in a given application may be selected, for example, for compatibility with a particular integrating amplifier, or to maximize a range of a digital-to-analog converter used to generate the reference signal. In addition, although the examples described above generally servo to low-frequency components of the detected signals, higher frequency components could be used instead of or in conjunction with the low-frequency components. Furthermore, those skilled in the art will recognize that the invention may be implemented using digital servo loops, and that the integrators could be replaced with other signal processing hardware.

While a presently preferred embodiment of the invention has been shown and described, it will be manifest that many additional changes and modifications may be made therein without departing from the essential spirit of the invention. It is intended, therefore, in the annexed claims, to cover all such changes and modifications as may fall within the true scope of the invention.

PARTS LIST $C_{A1}$, $C_{A2}$ capacitors
$C_{B1}$, $C_{B2}$ capacitors
$V_{C1}$, $V_{C2}$ control voltages
$V_S$ set point voltage
20 optical data storage system
32 optical source
34 collimating lens
36 beam splitter/expander
37 beam splitter surface
38 detector focusing lens
40 front facet detector
44 objective lens
46 optical storage medium
46A data storage surface
46B transparent substrate
50 beam splitter
51 beam splitter surface
52 detector focusing lens
54 detector array
56 lens
58 wave plate
60 beam splitter
61 beam splitter surface
62, 64 detectors
63, 65 preamplifiers
66, 68 variable gain amplifiers
72 differential amplifier
122, 124 low pass filters
130, 132 error detector/integrators
134, 136 amplifiers
140, 142 feedback signal line
150 delay element

We claim:

1. An apparatus for use in an optical system in which data is read from a medium by detecting first and second portions of a radiation beam in first and second detectors, respectively, the apparatus comprising:

first and second gain control circuits coupled to the first and second detectors, respectively, and receiving first and second detected signals therefrom, respectively, wherein each of the circuits is operative to alter the gain of a signal path of the corresponding detected signal in response to a control signal which varies in accordance with a difference between the corresponding detected signal and a reference signal; and a signal difference circuit coupled to the first and second gain control circuits and responsive to the first and second detected signals from the gain control circuits to produce a data signal corresponding to a difference between the detected signals.

2. The apparatus of claim 1 wherein the reference signal is a predetermined reference voltage level.

3. The apparatus of claim 1 further including at least one delay element connected between the signal difference circuit and one of the gain control circuits to substantially match a phase of the first and second detected signals at an input of the signal difference circuit.

4. The apparatus of claim 1 wherein each of the first and second gain control circuits further includes:

a variable gain amplifier connected to the corresponding detector and having a control signal input for receiving the control signal;

a low pass filter connected to an output of the variable gain amplifier; and an error detector connected to the low pass filter and having a first input for receiving the detected signal from the low pass filter, a second input for receiving the reference signal and an output corresponding to the control signal.

5. The apparatus of claim 4 wherein the error detector further includes an integrating amplifier having a capacitive element in a feedback path thereof.

6. The apparatus of claim 1 further including AC coupling means connected between the first and second gain control circuits and the signal difference circuit.

7. The apparatus of claim 6 wherein the AC coupling means includes first and second capacitors.

8. The apparatus of claim 1 wherein the medium is a coversheeted magneto-optic medium and the data signal from the signal difference circuit is a magneto-optic data signal.

9. The apparatus of claim 4 wherein the variable gain amplifiers in the gain control circuits are matched amplifiers in a multiple amplifier device.

10. The apparatus of claim 4 wherein the low pass filters have a cut-off frequency of about 100 kHz or less, such that the variable gains of the first and second gain control circuits are controlled in response to low-frequency amplitude differences between the reference signal and the first and second detected signals, respectively.

11. In an optical system in which data is read from a medium by generating first and second detected signals from first and second portions, respectively, of a radiation beam, a method of processing the detected signals comprising the steps of:

controlling the gain of a signal path of the first detected signal in response to a first control signal which varies in accordance with a difference between the first detected signal and a first reference signal;

controlling the gain of a signal path of the second detected signal in response to a second control signal which varies in accordance with a difference between the second detected signal and a second reference signal; and generating a data signal corresponding to a difference between the detected signals.

12. The method of claim 11 wherein the steps of controlling the gain in response to first and second control signals further include controlling the gain in response to a difference between the first and second detected signals, respectively, and a common reference voltage level.

13. The method of claim 11 further including the step of substantially matching a phase of the first and second detected signals prior to the step of generating a data signal therefrom.

14. The method of claim 11 wherein each of the steps of controlling the gain further includes the steps of:

providing a variable gain amplifier in the corresponding signal path, the variable gain amplifier having a control signal input for receiving the corresponding control signal;

low pass filtering an output of the variable gain amplifier; and generating the control signal by comparing the low pass filtered output of the variable gain amplifier to the reference signal.

15. The method of claim 14 wherein the step of generating the control signal further includes integrating the difference between the filtered output of the variable gain amplifier and the reference signal.

16. The method of claim 11 further including the step of AC coupling the signal paths of the first and second detected signals.

17. The method of claim 11 wherein the medium is a magneto-optic medium and the step of generating a data signal further includes generating a magneto-optic data signal.

18. The method of claim 14 wherein the step of providing variable gain amplifiers includes providing matched variable gain amplifiers in a multiple amplifier device.

19. The method of claim 14 wherein the step of low pass filtering the variable gain amplifier output further includes filtering with a cut-off frequency of about 100 kHz or less, such that the variable gain amplifier is controlled in response to low-frequency amplitude differences between the reference signal and the corresponding detected signal.

20. A magneto-optic data storage system in which data is read from a magneto-optic medium using a radiation beam, comprising:

a beam splitter arranged in an optical path of a return beam resulting from application of the radiation beam to the medium and operative to separate the return beam into first and second portions;

first and second detectors for generating first and second detected signals, respectively, from the first and second portions;

a first gain control circuit adapted to receive the first detected signal and to adjust a signal level thereof in response to a first control signal;

a second gain control circuit adapted to receive the second detected signal and to adjust a signal level thereof in response to a second control signal; and a signal difference circuit coupled to the first and second gain control circuits and responsive to the first and second detected signals from the gain control circuits to produce a data signal corresponding to a difference between the detected signals.

* * * * *